United States Patent [19]

Story et al.

[11] Patent Number: 4,892,382

[45] Date of Patent: Jan. 9, 1990

[54] DIELECTRIC OPTICAL DROP CABLE

[75] Inventors: Christopher A. Story, Hickory; Susan M. Cooper, Newton, both of N.C.

[73] Assignee: Siecor Corporation, Hickory, N.C.

[21] Appl. No.: 249,112

[22] Filed: Sep. 26, 1988

[51] Int. Cl.$^4$ ............................................... G02B 6/44
[52] U.S. Cl. .................................................. 350/96.23
[58] Field of Search ........................... 350/96.10, 96.23; 174/70 R, 23 C

[56] References Cited

U.S. PATENT DOCUMENTS

| 4,370,023 | 1/1983 | Lange et al. | 350/96.23 |
| 4,743,085 | 5/1988 | Jenkins et al. | 350/96.23 |
| 4,772,091 | 9/1988 | Oestreich | 350/96.23 |
| 4,818,060 | 4/1989 | Arroyo | 350/96.23 |

FOREIGN PATENT DOCUMENTS 3201981  8/1983  Fed. Rep. of Germany .

OTHER PUBLICATIONS

Arroyo and Panuska article, 1987 International Wire and Cable Symposium Proceedings, pp. 344–349 (pub. 11/87).

Primary Examiner—William L. Sikes
Assistant Examiner—Akm E. Ullah
Attorney, Agent, or Firm—J. David Abernethy

[57] ABSTRACT

A flame resistant dielectric optical drop cable having a first tube containing an optical fiber in a filling compound of hydrophobic gel; a first layer of densely packed loose glass yarn material circumscribing the first tube; a second layer of glass fiber members impregnated with resinous material circumscribing the first layer; and a second tube which is made of a flame retardant material circumscribing the second layer.

2 Claims, 1 Drawing Sheet

DIELECTRIC OPTICAL DROP CABLE

BACKGROUND OF THE INVENTION

1. Field of the Invention. The field of the invention is dielectric optical cable.

2. Background of the Invention. Fiber optic transmission systems are becoming more and more common in actual usage in today's communication requirements. In order to take full advantage of fiber optic technology, optical cables are needed which correspond to the familiar drop cables of the copper cable industry: i.e., a cable which connects the general loop to an individual subscriber residence. Typically, such cables are required to meet Underwriters Laboratories' VW-1 (Vertical-Wire) flame propagation requirements because the cable is designed to be attached to the outside of a residence.

Because the cable must also be installed outdoors, the usual requirement is that the cable be filled with water-blocking compounds (typically greases) so that water does not travel longitudinally through the cable.

U S. Pat. No. 4,743,085, issued May 10, 1988, is incorporated herein by reference. Disclosed therein is a dielectric fiber optic cable in which the optical fibers are disposed in a waterblocking material. While the waterblocking material tends to keep water away from the optical fibers, such waterblocking materials are typically flammable.

The Article, "A High Performance Non-Metalic Sheath for Light Guide Cables," published on pages 344-349 of the 1987 International Wire and Cable Symposium Proceedings discusses a cable which is believed to be the same as that disclosed in U. S. Pat. No. 4,743,085. The magazine article discloses that a second fire resistant cable is also available. This fire resistant cable does not contain a filling compound.

SUMMARY OF THE INVENTION

The optical fiber cable of this invention simultaneously fulfills the requirements of waterblocking and flame propagation retardance. The optical fiber cable comprises a core delimited by an inner jacket containing at least one optical fiber and a waterblocking compound. An outer jacket encloses the inner jacket. Disposed in the space between the outer and the inner jackets is a first layer of densely packed loose glass yarn material circumscribing the first tube and a second layer of glass fiber members impregnated with resinous material circumscribing the first layer.

BRIEF DESCRIPTION OF THE DRAWINGS

The detailed description of the preferred embodiment refers to the accompanying drawings, in which.

DETAILED DESCRIPTION OF THE PREFERRED EMBODIMENT

Figure 1:
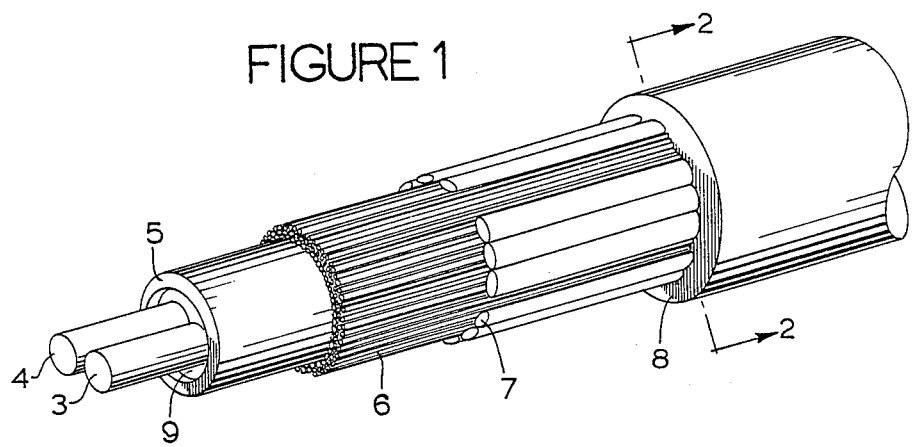
FIG. 1 is a perspective view of an optical fiber cable according to the invention.
Figure 2:
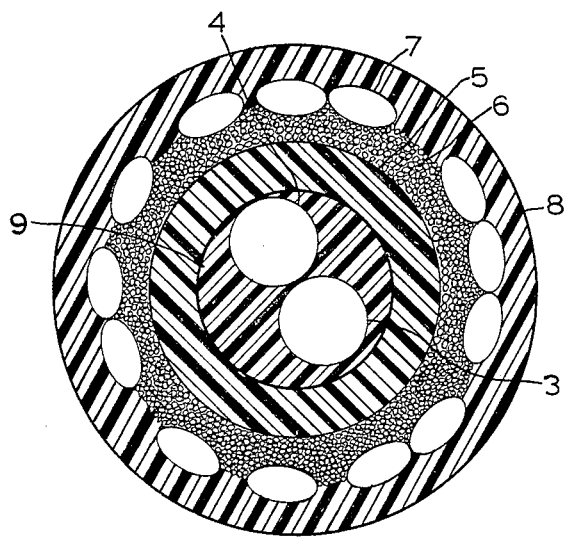
FIG. 2 is a cross-sectional view along line 2—2 of FIG. 1.

Referring to FIGS. 1 and 2, the preferred embodiment of the optical fiber cable according to the invention comprises a core, having optical fibers 3, 4 therein, within first tube 5. The space within first tube 5 not occupied by optical fibers is filled with a hydrophobic filling compound 9. First tube 5 is made out of a flame retardant material such as flame retardant thermoplastic rubber marketed under the tradename of Shell-Elexar 8730. Surrounding first tube 5 is a layer of densely packed loose fiberglass 6 which is marketed under the tradename of Owens-Corning ECG. Circumscribing fiberglass yarn material 6 is a layer of polyurethane impregnated fiberglass marketed by PPG Industries under the tradename Hercuflex HF-2000. The second tube 8 may also consist of flame retardant TPR.

This cable has been shown in testing to pass when subjected to the VW-1 (vertical wire) flame test promulgated by Underwriters Laboratories, Inc. in 1985, which is set out below. 1080.1 VW-1 (Vertical-Wire) Flame Test. A vertical specimen shall not flame longer than 60 s following any of five 15-s applications of the test flame, the period between applications being (1) 15 s if the specimen flaming ceases within 15 s, or (2) the duration of the specimen flaming if the specimen flame persists longer than 15 s. The specimen shall not ignite combustible materials in its vicinity or damage more than 25 percent of the indicator flag during, between, or after the five applications of the test flame. The test is to be conducted as described in paragraphs 1080.2-1080.9.

1080.2 For flexible cord, fixture wire, or Christmas tree wire, this test is to be performed on unaged specimens of the finished cord or wire, on the circuit conductors from the finished cord if the cord is other than the braidless parallel type, and on any grounding conductor from the finished cord. For thermoplastic-or rubber-insulated wire and cable, this test is to be performed on finished No. 14 AWG copper or No. 12 AWG aluminum or copper-clad aluminum single-conductor unaged specimens. The test is to be conducted in a 3-sided metal enclosure in an exhaust hood or cabinet. The metal enclosure is to be 12 in. or 305 mm wide, 14 in. or 355 mm deep, 24 in. or 610 mm high, and the top and front are to be open. An 18 in. or 457 mm specimen cut from a sample length of the finished cord is to be secured with its longitudinal axis vertical in the center of the enclosure. A flat horizontal layer of untreated surgical cotton ¼-1 in. or 6-25 mm thick is to cover the floor of the enclosure. The upper surface of the cotton is to be 9-9½in. or 229-241 mm below point B, which is the point at which the tip of the blue inner cone of the test flame touches the specimen (this is shown in FIG. 1080.1).

10.80.3 A Tirrill gas burner (such a burner differs from a Bunsen burner in that the air flow as well as the flow of gas is adjustable) with or without a gas pilot light attached is to supply the flame. The barrel of the burner is to extend 4 in. or 102 mm above the air inlets and its inside diameter is to be ⅜in. or 9.5 mm. While the barrel is vertical and the burner is well away from the specimen, the overall height of the flame is to be adjusted to approximately 4-5 in. or 100-125 mm. The blue inner cone is to be 1½ in. or 38 mm high and the temperature at its tip is to be 816° C. (1500° F.) or higher as measured using a chromel-alumel (nickel-chromium and nickel-manganese-aluminum) thermocouple. Without disturbing the adjustments for the height of the flame, the valve supplying gas to the burner flame and the separate valve supplying gas to any pilot flame are to be closed.

1080.4 A wedge (acceptable dimensions are shown in FIG. 1060.2) to which the base of the burner can be secured is to be provided for tilting the barrel 20° from the vertical while the longitudinal axis of the barrel remains in a vertical plane. The burner is to be secured to the wedge and the assembly is to be placed in an adjustable support jig. A layer of untreated surgical cotton ¼-1 in or 6-25 mm thick is to be placed on the wedge and around the base of the burner. The jig is to be adjusted toward one side or the other of the enclosure to place the longitudinal axis of the barrel in the vertical plane that contains the longitudinal axis of the specimen. The plane is to be parallel to the sides of the enclosure. The jig is also to be adjusted toward the rear or front of the enclosure to position the point A, which is the intersection of the longitudinal axis of the barrel with the plane of the tip of the barrel, 1-½in. or 38 mm from the point B at which the extended longitudinal axis of the barrel meets the outer surface of the specimen. Point B is the point at which the tip of the blue inner cone is to touch the center of the front of the specimen.

1080.5 In the absence of a gas pilot light on the burner, the support for the burner and wedge is to be arranged to enable the burner to be quickly removed from and precisely returned to the position described in paragraph 1080.4 without disturbing the layer of cotton on the floor of the enclosure or the cotton on the wedge and around the base of the burner.

1080.6 A strip of unreinforced 60-lb or 94-g/m² kraft paper that is ½in. or 13 mm wide, approximately 5 mils or 0.1 mm thick, and is gummed on one side is to be used to make an indicator flag. The gumming is to be moistened just to facilitate adhesion. With the gum toward the specimen, the strip is to be wrapped around the specimen once with its lower edge 10 in. or 254 mm above B, the point at which the blue inner cone is to touch the specimen. The ends of the strip are to be pasted together evenly and trimmed to provide a flag that projects ¾in. or 19 mm from the specimen toward the rear of the enclosure with the flag parallel to the sides of the enclosure (see FIG. 1080.1). In testing a flat cord, the flag is to project from the center of the rear broad face of the cord and the test flame is to be applied to the front board face. The lower clamp or other support for the specimen is to be adjusted vertically to keep it from being any closer than 3 in. or 76 mm to point B.

1080.7 If the burner has a gas pilot light, the valve supplying gas to the pilot is to be opened and the pilot lit. If the burner does not have a gas pilot light, the burner is to be supported as indicated in paragraph 1080.5 in a position away from the specimen and the pilot is to be lit. This operation and the remainder of the test are to be conducted under a forced-draft exhaust hood or cabinet operating to provide removal of smoke and fumes, but not having drafts that affect the flame.

1080.8 If the burner has a gas pilot light, the valve supplying gas to the burner is to be opened to apply the flame to the specimen automatically. This valve is to be held open for 15 s, closed for 15 s (longer if flaming of the specimen persists —see the last two sentences of this paragraph), open for 15 s, and so forth for a total), of five 15 s applications of the gas flame to the specimen with 15 s (longer if flaming of the specimen persists —see the last two sentences of this paragraph) between applications. If the burner does not have a gas pilot light, the burner is to be moved into position to apply the gas flame to the specimen, kept there for 15 s, removed for 15 s (longer if flaming of the specimen persists (see the last two sentences of this paragraph) and so forth for a total of five 15 s applications of the gas flame to the specimen with 15 s (longer if flaming of the specimen persists —see last two sentences of this paragraph) between applications. The gas flame is to be reapplied to the specimen 15 s after the previous application if flaming of the specimen ceases of its own accord within 15 s of the previous application. If flaming of the specimen persists longer than 15 s after the previous application of the gas flame, the gas flame is not to be reapplied until flaming of the specimen ceases of its own accord. In the latter case, the gas flame is to be reapplied as soon as flaming of the specimen ceases.

1080.9 If any specimen of the wire or of the cord or its circuit conductors (1) shows more than 25 percent of the indicator flag burned away or charred (soot that can be removed with a cloth or the fingers and brown scorching are to be ignored) after any of the five applications of flame, the wire or cord is to be judged capable of conveying flame along its length. If any specimen of the wire or of the cord or its insulated circuit and any grounding conductors (2) emits flaming or glowing particles or flaming drops at any time that ignite the cotton on the burner wedge, or floor of the enclosure (flameless charring of the cotton is to be ignored), the wire or cord is to be judged capable of conveying flame to combustible materials in its vicinity. If any specimen of the wire or of the cord or its insulated circuit and any grounding conductors (3) continues to flame longer than 60 s after any application of the gas flame, the wire or cord is to be judged capable of conveying flame to combustible materials in its vicinity. (End of test description.)

A major improvement of the described improved optical fiber cable is that the cable passes the hereinabove set out Underwriters Laboratories standard while still containing hydrophobic waterblocking compound 9. Such waterblocking compounds are generally flammable. For a cable to contain the flammable waterblocking compound, and yet pass the flame test set out hereinabove, makes the cable ideal for use as a drop cable. It should be noted that UL approval has been applied for, but not yet granted.

In the preferred embodiment, the optical fibers are commercially available fibers consisting of a core, a cladding layer around the core, and a plastic coating surrounding the cladding. Each optical fiber would be overcoated with nylon using a pressure extrusion process, resulting in a final outer diameter of the overcoated fibers of around 900 um. The coated fibers are then fed through an extruder crosshead with constant tension. The hydrophobic filling compound (gel) is fed with a constant pressure with the fibers into the back of the extruder crosshead. The first (inner) tube material is then pressure extruded over the fibers and the gel, forming the inner tube of the cable. Fiber tension and the tube cooling process should be controlled such that the excess fiber length is optimized. The first layer of densely packed loose glass yarn material (fiberglass yarns) are helically wrapped around the first tube. A small amount of water swellable powder such as acrylic acid based polymer may be applied over the fiberglass yarns using a commercially available talc applicator. The second layer of glass fiber members impregnated with resinous material are helically wrapped over the layer of fiberglass yarns and powder. The second tube is then pressure extruded.

We claim:
1. An optical fiber cable comprising:
 (a) a first tube which is made of a flame retardant material;
 (b) at least one optical fiber and a hydrophobic filling compound disposed in the first tube;

(c) a first layer of densely packed loose glass yarn material circumscribing the first tube;

(d) a second layer of glass fiber members impregnated with resinous material circumscribing the first layer; and (e) a second tube which is made of a flame retardant material circumscribing the second layer.

2. An optical fiber cable which passes if subjected to the VW-1 (vertical Wire) flame test promulgated by Underwriters Laboratories, Inc. in 1985, comprising:

(a) a first tube which is made of a flame retardant material;

(b) at least one optical fiber and a hydrophobic filling compound disposed in the first tube;

(c) a first layer of densely packed loose glass yarn material circumscribing the first tube;

(d) a second layer of glass fiber members impregnated with resinous material circumscribing the first layer; and (e) a second tube which is made of a flame retardant material circumscribing the second layer.

* * * * *